US008631651B2

(12) United States Patent
Elliott et al.

(10) Patent No.: US 8,631,651 B2
(45) Date of Patent: Jan. 21, 2014

(54) HYDRAULIC SYSTEM THERMAL CONTRACTION COMPENSATION APPARATUS AND METHOD

(75) Inventors: Timothy F. Elliott, Chambersburg, PA (US); Stephen D. Smith, Mercersburg, PA (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 1163 days.

(21) Appl. No.: 12/559,253

(22) Filed: Sep. 14, 2009

(65) Prior Publication Data

US 2010/0180585 A1 Jul. 22, 2010

Related U.S. Application Data

(60) Provisional application No. 61/202,030, filed on Jan. 21, 2009.

(51) Int. Cl.
*F16D 31/02* (2006.01)

(52) U.S. Cl.
USPC .............................. 60/463; 91/358 R; 91/392

(58) Field of Classification Search
USPC ........... 60/459, 463; 91/358 R, 392; 212/277, 212/278, 287, 288, 289, 348, 349, 350, 271, 212/276
See application file for complete search history.

(56) References Cited

U.S. PATENT DOCUMENTS

| | | | | |
|---|---|---|---|---|
| 6,405,114 | B1 * | 6/2002 | Priestley et al. | 701/50 |
| 6,634,172 | B2 * | 10/2003 | Schoonmaker et al. | 60/329 |
| 7,246,684 | B2 * | 7/2007 | Bean | 187/224 |
| 2007/0056280 | A1 * | 3/2007 | Bitter | 60/468 |

FOREIGN PATENT DOCUMENTS

| | | |
|---|---|---|
| JP | 58 121306 A | 7/1983 |
| JP | 4 303389 A | 10/1992 |
| JP | 9216786 | 8/1997 |
| JP | 11139766 | 5/1999 |
| JP | 2001-240381 | 9/2001 |

* cited by examiner

*Primary Examiner* — Edward Look
*Assistant Examiner* — Michael Quandt

(57) ABSTRACT

An apparatus for compensating for fluid contraction in a hydraulic powered telescoping boom may include a monitor determining the elevation angle of the telescoping boom, a supply of hydraulic fluid, and a fluid control responsive to the monitor. The fluid control provides the hydraulic fluid from the supply to a hydraulic cylinder controlling extension of the telescoping boom when the elevation angle exceeds a predetermined threshold angle to compensate for thermal contraction of hydraulic fluid and thus prevent uncommanded boom retraction. A method in accordance with the invention is also disclosed.

18 Claims, 5 Drawing Sheets

HYDRAULIC SYSTEM THERMAL CONTRACTION COMPENSATION APPARATUS AND METHOD

This application claims priority to Provisional Application 61/202,030 filed on Jan. 21, 2009, the entirety of which is incorporated herein by reference.

BACKGROUND OF THE INVENTION

Load lifting devices such as cranes, and especially mobile cranes, often use telescoping booms to achieve the necessary lift height. A telescoping boom is made up of multiple sections which telescope with respect to one another to change the overall length of the boom. The telescoping boom of a portable crane is often extended by one or more hydraulic devices, typically cylinders, acting on the sections of the boom. Fluid is supplied to, or removed from, a hydraulic cylinder to cause a piston to move within the hydraulic cylinder. Movement of the piston enables the boom of the load lifting device to extend or contract.

A natural phenomenon is known to occur in telescoping booms, caused by thermal expansion and the subsequent contraction of fluid in the hydraulic cylinder supporting the boom. This natural phenomenon may be observed when a load lifting device is operated for extended periods of time causing the fluid in the hydraulic cylinder to heat up and subsequently cool down. Hydraulic fluid expands when it is heated and contracts when it is cooled. A load lifting device may be left idle for a period of time during which the fluid cools down. During such time the elevation angle of the boom above horizontal may be relatively low. In this instance, when the fluid cools it contracts but the boom may sometimes not retract because of frictional forces acting between individual boom sections. This effect varies depending on the particular boom configuration, the level of friction between individual sections of the boom, lubrication of the boom sections, and other possible environmental factors. Thus, the telescoping boom could remain extended even though the boom sections are not fully supported by fluid in hydraulic cylinders.

In the described situation the relative positions of the boom sections might be supported by friction between individual sections of the boom. If the lifting machine operator elevates the boom from the low elevation angle position the boom will remain at the same boom length for a certain range of elevation angles. However, if the operator continues to elevate the boom, the boom will eventually reach an elevation angle where the weight of the boom sections or a combination of the weight of the sections and any other load overcomes the friction between boom sections. At this point, the boom may retract until the column of fluid in the cylinders again fully supports the boom sections. As can be appreciated, this uncommanded boom retraction is undesirable. The present invention provides a system and a method for avoiding this undesirable situation.

SUMMARY OF THE INVENTION

The apparatus and method of the invention compensates for fluid cooling and contraction, as described, while avoiding the potential for operator errors. This invention avoids uncommanded boom retraction without requiring manual operator intervention or a high pressure source of hydraulic fluid. The invention additionally comprises a device that can be advantageously easy to retrofit into existing crane or it may be incorporated in a crane at the time of original manufacture.

The invention requires only a relatively low-pressure source of hydraulic fluid which is often part of an existing lifting machine. The hydraulic source for the invention can also be provided as an add-on or auxiliary to the existing hydraulic system of a crane. Furthermore, the apparatus and method of the invention avoids the need for re-synchronizing the boom sections of a crane because the invention replenishes fluid in hydraulic cylinders without changing the boom extension. The boom sections are properly synchronized when the boom is originally extended and the boom extension length does not change significantly when the fluid in the hydraulic cylinders is replenished according to the present invention.

An apparatus for compensating for fluid contraction in a hydraulic powered telescoping boom according to the invention may include a monitor determining the elevation angle of the telescoping boom, a supply of hydraulic fluid, and a fluid control responsive to the monitor for providing hydraulic fluid from the supply to a hydraulic cylinder or equivalent device controlling extension of the telescoping boom when the boom elevation angle exceeds a predetermined threshold angle. A threshold angle of thirty-five degrees above horizontal may be a typical setting in accordance with the invention as this is representative of an angle below which frictional forces may be significant in retaining the relative positions of booms sections in many cranes while, above that angle the frictional forces may no longer retain the boom sections against their own weight and/or other imposed loads.

The apparatus may also include a control valve configured to supply hydraulic fluid to the hydraulic cylinder in response to a signal generated by the monitor when the elevation angle of the boom exceeds the threshold angle.

The apparatus may further include a pressure sensor monitoring pressure of the fluid provided to the hydraulic cylinder and generating a signal in response to a detected drop of pressure below a minimum pressure. Further, a device generating a signal perceivable by an operator responsive to the signal generated by said pressure sensor may also be included. In a preferred embodiment it may be desirable to use a pressure sensor which continuously closes an electrical circuit unless the monitored pressure exceeds the desired minimum.

The invention calls for a supply of hydraulic fluid providing fluid to the apparatus at an appropriate pressure at least high enough to support the boom. In typical applications, this pressure may be about 200 PSI. This supply may also be the hydraulic circuit which powers the telescoping extension cylinders as part of normal boom extension, or it may be a different or auxiliary hydraulic supply. In one example, the supply of hydraulic fluid may be a hydraulic circuit providing hydraulic fluid to a wind speed indicator.

The apparatus may also include a pressure reducing relieving valve controlling pressure of fluid supplied by the invention. This may be accomplished by releasing a portion of the hydraulic fluid back to a hydraulic fluid reservoir.

The apparatus may further include a one-way valve fluidly connected to an output port of the apparatus. This prevents back-flow of fluid and, thus, isolates normal operation of the telescoping boom, such as extension and retraction, from the compensation function of the invention.

According to the invention, a method of compensating for fluid contraction in a hydraulic powered telescoping boom may include monitoring the elevation angle of the telescoping boom and supplying fluid to a hydraulic cylinder controlling extension of the telescoping boom when the elevation angle exceeds a predetermined threshold angle. The threshold angle may be set at thirty-five degrees above horizontal or at other angles suitable to individual cranes.

The method may further include generating a signal when the elevation angle of the boom exceeds the threshold angle and energizing a control valve in response to the signal to supply hydraulic fluid to the hydraulic cylinder. In an embodiment the method could additionally include opening a fluid connection controlled by the control valve into the hydraulic cylinder. Pressure of fluid supplied to the hydraulic cylinder may be controlled by releasing fluid through a relief valve.

The method could also include monitoring for any drop of pressure of the hydraulic fluid being supplied to the hydraulic cylinder, and generating a signal in response to the detected drop of pressure. A notification perceivable by an operator can be generated in response to the low pressure signal. In an advantageous embodiment the signal can be continuously generated unless the pressure of the hydraulic fluid being supplied to the hydraulic cylinder exceeds the desired minimum. A one-way valve may be provided to prevent a reverse of flow of fluid in the device and method of the invention.

An advantage of a device in accordance with the invention is that it is easily retrofit in a lifting device with a hydraulic powered telescoping boom. The inventive device may include a pressure source such as a pump, or it may utilize components already in place on a crane.

The foregoing is a summary and thus contains, by necessity, simplifications, generalization, and omissions of detail. Consequently, those skilled in the art will appreciate that the summary is illustrative only and is not intended to be in any way limiting. Other aspects, features, and advantages of the devices and/or methods of the invention will become apparent in the teachings set forth herein.

BRIEF DESCRIPTION OF THE DRAWINGS

The foregoing and other features and advantages of the present invention will become more fully apparent from the following description and appended claims, taken in conjunction with the accompanying drawings wherein:

DETAILED DESCRIPTION

Figure 1:
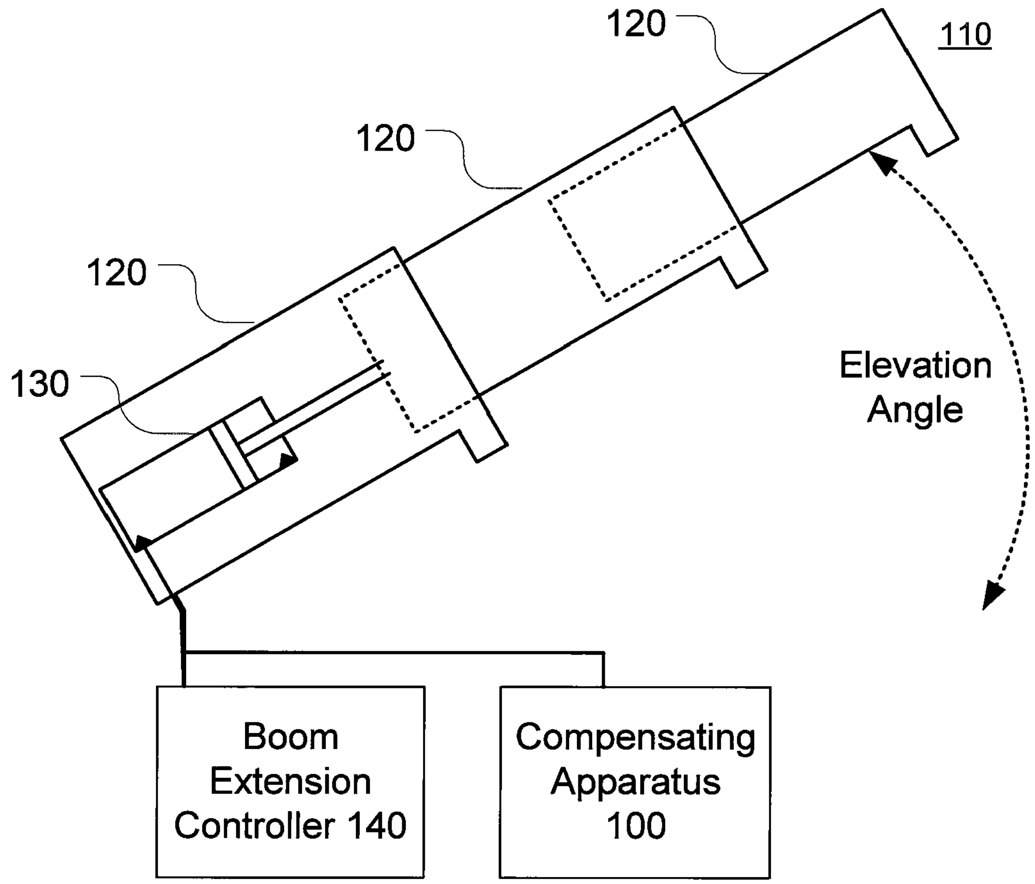
FIG. 1 is a schematic example of a telescoping boom of a lifting machine.

FIG. 1 illustrates an example of a telescoping boom 110. Boom sections 120 are configured in a telescoping configuration and may be extended and retracted by one or more hydraulic cylinders, only one hydraulic cylinder 130 being shown. The boom extension controller 140 controls actuation of individual hydraulic cylinders 130 to achieve a desired boom extension length and appropriate extension sequencing. Telescoping boom 110 is shown as elevated at a certain elevation angle above horizontal. According to the invention, compensating apparatus 100 compensates for hydraulic fluid cooling which could cause uncommanded boom retraction.

Figure 2:
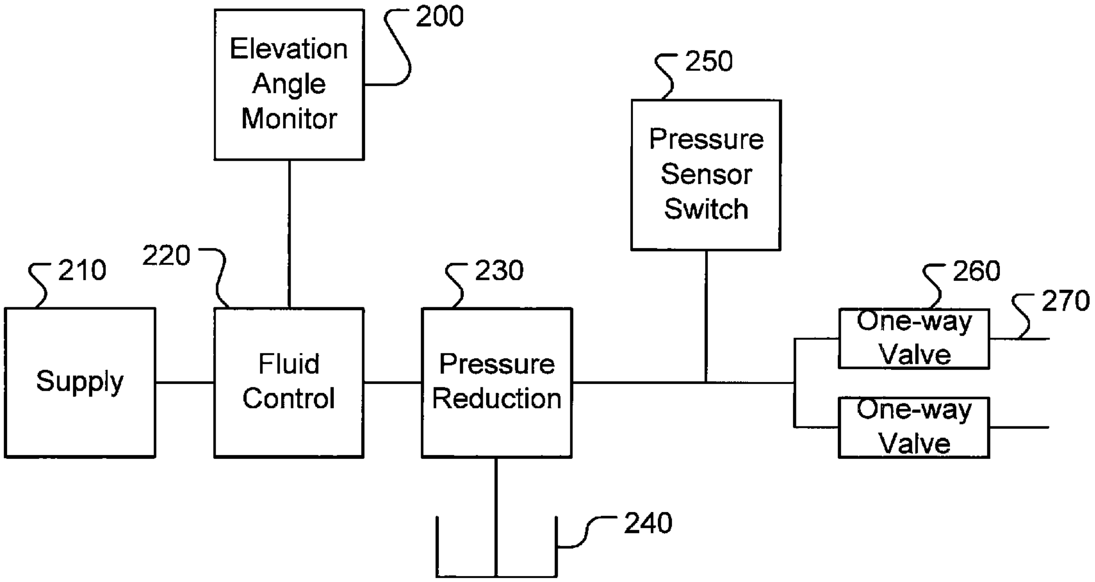
FIG. 2 is a schematic illustration of a compensating apparatus according to an exemplary embodiment of the invention.

FIG. 2 schematically illustrates an exemplary embodiment of the compensating apparatus 100. Elevation angle monitor 200 detects the elevation angle of the telescoping boom 110 above horizontal. When the elevation angle exceeds a predetermined threshold, it supplies a signal to a fluid control 220. Fluid control 220 may be implemented as a normally-closed position two-way solenoid valve. Thus, the valve, when closed, prevents any hydraulic fluid supplied by supply 210 from reaching the rest of a hydraulic circuit that extends and retracts the boom.

Once elevation monitor 200 supplies a signal to the fluid control 220, the control opens a fluid connection from the supply 210. If 220 is a solenoid valve, this can be accomplished, for example, by simply actuating the solenoid. As shown in FIG. 2, the pressure of the fluid in the circuit may be regulated by pressure reduction means 230. Pressure reduction means 230 may be a relief valve configured to release fluid exceeding a predetermined pressure threshold or any device providing the same function.

In an exemplary embodiment, the pressure relief valve may be set for 200 PSI (pounds per square inch). Thus, hydraulic fluid which is provided at a higher pressure than 200 PSI will be released into reservoir 240. Reservoir 240 is an overflow reservoir of hydraulic fluid, which can then be reused in the hydraulic circuit as it is again pressurized and recycled throughout the system. Thus, reservoir 240 can provide fluid back to supply 210.

The hydraulic fluid downstream of valve 230 is regulated to a desired pressure, approximately 200 PSI in the example given. Of course, it should be understood that 200 PSI is a value used in an example embodiment implemented with a particular lifting machine configuration and is not in any way limiting. For different lifting machine configurations the appropriate pressure can be determined experimentally or through modeling.

The exemplary embodiment uses 200 PSI as the replenishing pressure to the cylinders. This value was arrived at by experimentation to determine a value which would support the weight of the boom in its extended configuration, but would not further extend the cylinder or the boom without a specific boom extend command. As can be appreciated, friction plays a great role in the system. Thus, in the exemplary embodiment, 200 PSI is not sufficient to overcome the friction between boom sections and, thus, will not extend the boom. On the other hand, this pressure is sufficient to support the boom in its existing configuration having already been extended.

The supply 210 illustrated in FIG. 2 is a source of pressurized hydraulic fluid. This may be obtained from a variety of sources. Supply 210 may be a hydraulic line from a swing parking brake release function on the swing, steering, and auxiliary manifold of the crane. The supply may also be the source which is used to power a wind speed indicator when the crane is equipped with that option. However this does not limit the source to only such options and it could be powered by many other sources of high-pressure hydraulic fluid already present on the lifting machine, or by a dedicated pump connected to a reservoir of hydraulic fluid. It is advantageous to use a source of hydraulic fluid which gets pressurized immediately when the lifting machine is turned on. This type of fluid source will immediately provide pressure without any operator input, thus avoiding the possibility of operator error in forgetting to power on the compensation apparatus.

The supply 210 may provide fluid at a pressure from another hydraulic source that is higher than needed for the compensation system, i.e., at 250 PSI, as soon as the engine of the lifting machine is started. Thus, fluid control 220 will receive a constant source of high-pressure hydraulic fluid immediately when the engine is started. Indeed, this is advantageous as the system is automatically powered on immediately when the engine is started, which is always done as the first thing when operating the lifting machine.

Elevation angle monitor 200 monitors the elevation angle of the telescoping boom above the horizontal. The elevation angle monitor 200 may be implemented as an analog sensor, a digital sensor, or an output of the lifting machine control computer. The particular implementation is not limiting. The elevation angle monitor 200 continuously detects the boom elevation angle and commands the fluid control 220 to provide fluid to the rest of the circuit when a predetermined elevation angle threshold is exceeded. Thus, at elevation angles which are lower than the threshold angle, the fluid control 220 remains closed and no fluid is supplied to the rest of the circuit. However, once the threshold angle is exceeded, fluid control 220 opens and provides fluid to the rest of the circuit, thus supplying recharging fluid through a check valve 260 to a hydraulic cylinder powering the telescoping boom. If there are multiple hydraulic cylinders powering the boom, a corresponding multiple of valves 260 may be provided, one for each cylinder.

It is important that elevation monitor 200 not command opening of valve 220 too early because it has been shown that even a very small amount of pressure (less than 15 PSI) is enough to extend a telescoping boom at a very low elevation angle. Therefore, the elevation monitor 200 should not permit flow through the rest of the compensation system until a predetermined elevation angle is reached. In a particular crane apparatus it has been determined that, at elevation angle of 35°, supplying a compensating flow of fluid at 200 PSI supports the boom in its already extended configuration but does not further extend the telescoping boom. The specific angle appropriate for achieving this balance in any particular crane will depend on the mass of the crane boom sections, the friction acting between adjacent telescopic boom sections, the pressure of fluid available to the compensation system and the desired operating pressure, and other factors affecting the individual model crane. The threshold angle to be detected by monitor 200 will have to be determined empirically for each model crane and set to actuate the compensation system of the invention at an angle of elevation whereat the boom is supported but does not expand undesirably.

Uncommanded boom retraction has been often observed at boom elevation angles exceeding 60° above horizontal. Thus, the threshold angle at which the compensating apparatus starts providing replenishing fluid must be lower than 60° in mostly any crane. To minimize the chance of boom retraction, the threshold angle should be set at the lowest angle at which the replenishing fluid (at available or set pressure) does not extend the boom without a specific boom extend command from the crane controls. Accordingly the threshold angle was set to 35° in a preferred embodiment.

The one-way valve 260 ensures that fluid supplied by the recharge circuit only flows in one direction, from the recharge/compensation circuit to the boom cylinder. The output port 270 then supplies fluid to the hydraulic cylinder 130. As shown in FIG. 1, the compensating apparatus may share a fluid connection with boom extension controller 140. Thus, the one-way valve 260 prevents back flow of hydraulic fluid through the recharge circuit when the boom extension controller 140 extends the boom and, thus, isolates the normal boom control function from the operation of the invention. Further, as shown in FIG. 2, the recharge circuit may include multiple one-way valves and multiple output ports, as appropriate for the relevant lifting machine.

As noted above, output port 270 is fluidly connected to a hydraulic cylinder 130 and the connection may be shared with the boom extension controller 140. Alternatively, port 270 may be connected to the cylinder via a dedicated port on the piston-side of the hydraulic cylinder 130.

The recharge circuit illustrated in FIG. 2 may also include a pressure sensor switch 250. Pressure sensor switch 250 may be implemented as a normally-closed pressure switch which opens an electrical connection when it detects a pressure above a certain threshold. Thus, pressure sensor switch 250 remains closed (keeping an electrical connection closed) unless it detects a pressure above a threshold. The electrical output of pressure sensor switch 250 may be connected to a signaling device which outputs a perceivable signal, such as a sound or optical signal perceivable by an operator. Thus, the operator of the lifting machine is notified by the perceivable signal that the pressure detected by pressure sensor switch 250 is below the threshold pressure. It is advantageous to use a normally closed pressure switch because it is very robust against failure of the pressure monitoring system. In other words, the pressure monitoring system indicates a failure to the operator unless it detects pressure above the threshold. Thus, if the pressure sensor switch 250 fails (such that it no longer can properly detect pressure), it will still indicate a failure to the operator.

Figure 3:
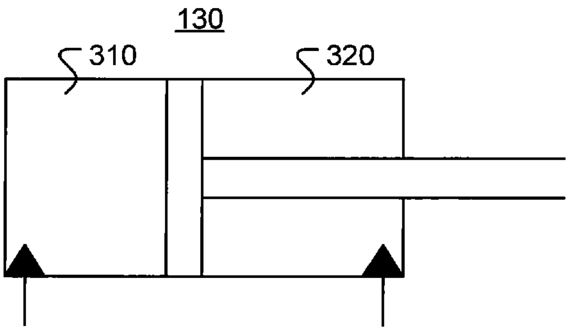
FIG. 3 is a schematic example of a hydraulic cylinder.

FIG. 3 illustrates an example of a hydraulic cylinder 130 controlling extension of a telescoping boom. Piston-side 310 receives hydraulic fluid through a port to control extension and contraction of hydraulic cylinder. Rod-side 320 may also receive hydraulic fluid to control contraction of the hydraulic cylinder. Although only two ports are illustrated in FIG. 3, it is understood that additional ports may be present in the hydraulic cylinder. Fluid for compensating for thermal contraction would normally be input to the piston side 310 to maintain the extended state of the boom, as discussed above.

Figure 4:
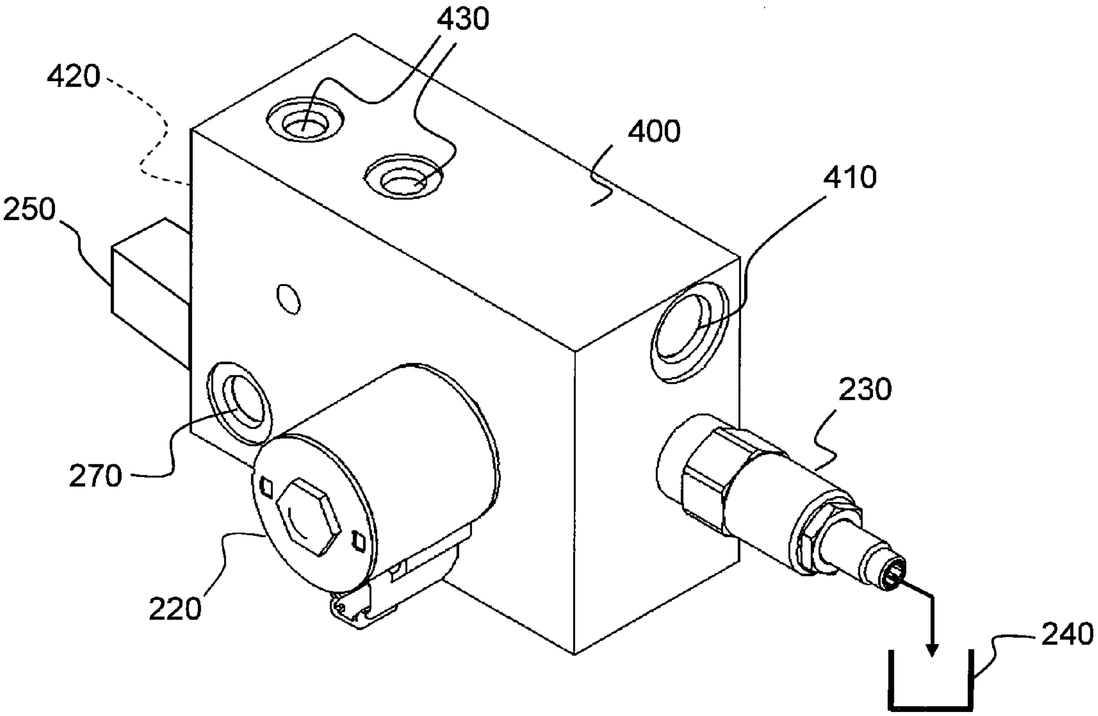
FIG. 4 depicts an example of an implementation of the compensating apparatus according to the invention.

FIG. 4 illustrates one example of an implementation of the compensating apparatus of the invention housed in a compact aluminum manifold. As shown in FIG. 4, the manifold housing 400 may be a simple box-shape and includes a number of openings. Fluid control 220 is connected to one of these openings. Pressure reduction means 230 (implemented as a pressure reducing valve) is connected to another one of the openings and includes a port fluidly connectable to reservoir 240. Further, pressure sensor switch 250 is connected to another one of the openings and is configured to sense pressure inside the manifold 400. One or more output ports 270 are provided through additional openings in the manifold 400. Manifold 400 also includes supply input 410 which is fluidly connected with supply 210. Further, the manifold also includes supply return 420 which outputs fluid provided through supply input 410. Thus, the manifold 400 can be advantageously connected in-line with an existing hydraulic fluid line with minimal impact on the existing hydraulic fluid line. Furthermore, manifold 400 may also include one or more diagnostic ports 430 which enable monitoring of pressure and/or temperature inside the manifold 400.

As can be understood from FIGS. 2 and 4, the compensating apparatus may be implemented as a device or kit that may be retrofit to an existing lifting machine. Further, the example embodiment illustrated in FIG. 4 is advantageously robust, compact, and efficient to manufacture. Of course, the compensating apparatus is not limited in any way to the implementation shown in FIG. 4, but may be adapted to the particular application at hand, to the relevant lifting machine being retrofitted, or to conveniences in manufacturing and/or installation.

Figure 5:
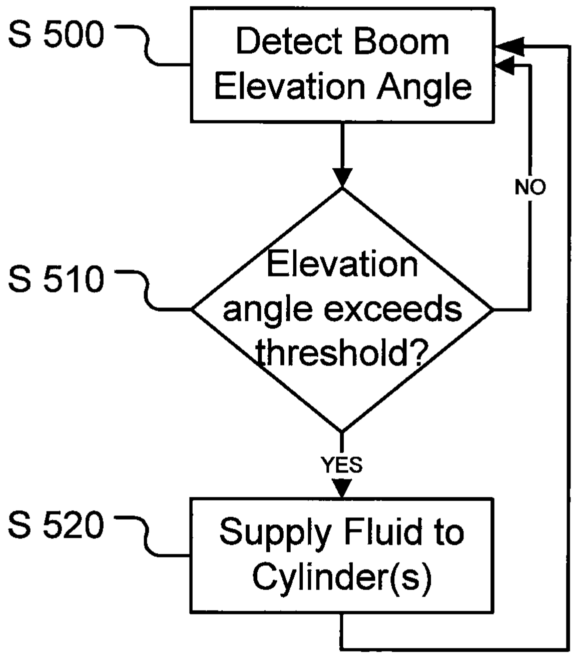
FIG. 5 is a flow chart describing a process according to an exemplary embodiment of the invention.

FIG. 5 schematically illustrates steps of a process for compensating for fluid contraction in a hydraulic powered telescoping boom. In step S 500, the elevation angle of the boom is detected. In step S 510, the elevation angle is compared to a predetermined threshold. In an example implementation the threshold angle was 35° above horizontal. If the elevation angle does not exceed the predetermined threshold angle, the process returns to detecting the boom elevation angle. Thus, the elevation angle is continuously monitored. When the elevation angle exceeds the threshold, fluid is supplied to hydraulic cylinders in step S 520. After fluid is supplied to hydraulic cylinders, the elevation angle of the boom is again detected, and continuously monitored. Thus, if the elevation angle of the boom decreases to below the threshold, the supplying of fluid to the cylinders is halted.

Figure 6:
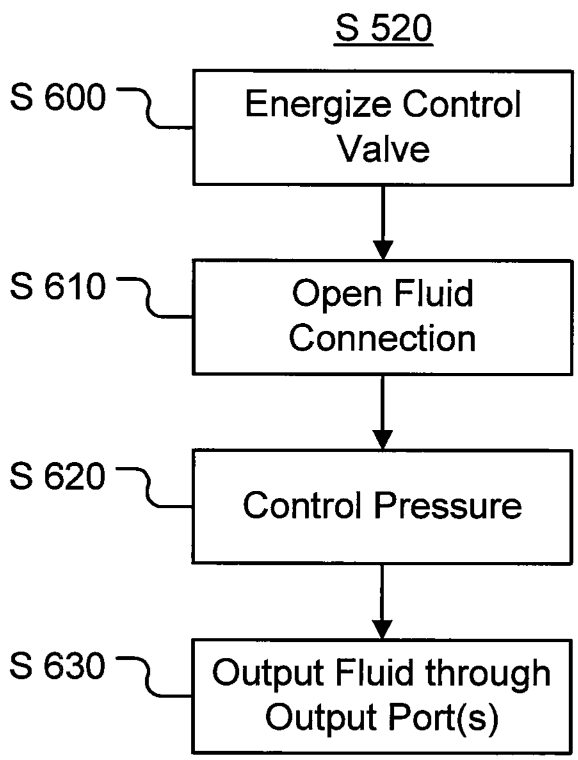
FIG. 6 is a flow chart describing an example of process steps according to an aspect of the invention.

FIG. 6 illustrates further details of step S 520. In step S 600 a control signal is passed to fluid controller 220, and, in an exemplary embodiment, a control valve is energized. Fluid controller 220 opens a fluid connection from supply 210 to the rest of the compensating apparatus in step S 610. Further, in step S 620 the pressure is controlled (and may be reduced by a pressure reduction means such as a pressure reducing relieving valve 230) to a predetermined pressure level. In an exemplary embodiment the pressure level may be set at 200 PSI, thus limiting the pressure that is output from the compensating apparatus in step S 630 to 200 PSI. Further, in step S 630 the outputting of fluid may be controlled such that the fluid is output in a single flow direction and a reverse of flow direction is prevented (for example by using a one-way valve such as 260).

Figure 7:
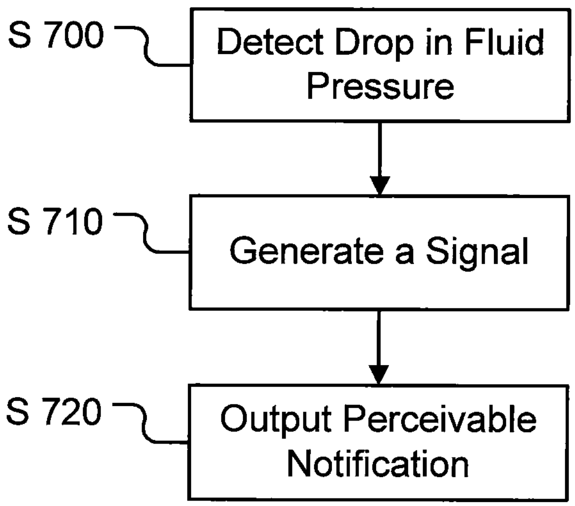
FIG. 7 is a flow chart describing a process of detecting a system failure according to an example of the invention.

Further, FIG. 7 illustrates a process of monitoring pressure in a compensating apparatus. In step S 700, the drop in fluid pressure is detected. In response to the detected drop in fluid pressure, a signal is generated in step S 710. Further, in step S 720 a perceivable notification is output. In some implementations it may be advantageous to continuously generate a notification signal in step S 710 unless and until the detected pressure rises above a predetermined threshold. This could be achieved, for example, by using a normally-closed switch which opens when pressure rises above the threshold.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of particular implementations. Thus, the example implementations are not limiting but rather illustrate a contemplated approach to solve a problem identified by the inventors.

Those skilled in the art will recognize that it is common within the art to describe devices and/or processes in the fashion set forth herein, and thereafter use engineering practices to integrate such described devices and/or processes into a larger system or systems. That is, at least a portion of the devices and/or processes described herein can be integrated into a mechanical system via a reasonable amount of experimentation.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus for compensating for fluid contraction in a hydraulic powered telescoping boom, comprising:

a monitor determining an elevation angle of the telescoping boom;

a supply of hydraulic fluid;

a fluid control responsive to the monitor for providing hydraulic fluid from the supply to a hydraulic device controlling extension of the telescoping boom when the elevation angle exceeds a predetermined threshold; and wherein the supply of hydraulic fluid is a hydraulic circuit normally supplying pressurized hydraulic fluid to the hydraulic device in response to a boom telescoping command.

2. The apparatus according to claim 1, wherein the fluid control comprises:

a control valve configured to supply hydraulic fluid to the hydraulic device in response to a signal generated by the monitor when the elevation angle of the boom exceeds the threshold angle.

3. The apparatus according to claim 1, wherein the monitor determines when the angle of elevation of the boom is at least thirty-five degrees elevation above horizontal.

4. The apparatus according to claim 1, further comprising:

a pressure sensor monitoring pressure of the fluid provided to the hydraulic device, the pressure sensor generating a signal in response to a detected drop of pressure of the fluid below a minimum pressure; and a signaling device responsive to the signal generated by the pressure sensor and generating a signal perceivable by an operator when the pressure is below the minimum pressure.

5. The apparatus according to claim 4, wherein the pressure sensor comprises:

a device that continuously closes an electrical circuit when the monitored pressure is less than the minimum pressure.

6. The apparatus according to claim 1, wherein the supply of hydraulic fluid is an auxiliary hydraulic circuit separate from the circuit normally supplying pressurized hydraulic fluid to the hydraulic device.

7. The apparatus according to claim 1, further comprising:

a one-way valve connected to an output port of the apparatus preventing fluid from flowing from the hydraulic device controlling extension of the telescoping boom back to the apparatus.

8. The apparatus according to claim 1, further comprising:

a relief valve controlling pressure in the fluid provided from the apparatus to the hydraulic device controlling extension of the telescopic boom.

9. A method of compensating for fluid contraction in a hydraulic powered telescoping boom, the method comprising:

monitoring the elevation angle of the telescoping boom;

supplying fluid to a hydraulic device controlling extension of the telescoping boom when the elevation angle exceeds a predetermined threshold angle;

opening a fluid connection to permit flow of fluid into the hydraulic device; and controlling pressure of fluid supplied to the hydraulic device.

10. The method according to claim 9, comprising supplying fluid to a hydraulic device controlling extension of the telescoping boom when the elevation angle of the boom is at least thirty-five degrees elevation above horizontal.

11. The method according to claim 9, further comprising:

generating a signal when the elevation angle of the boom exceeds the threshold angle; and actuating a control in response to the signal to supply hydraulic fluid to the hydraulic device.

12. The method according to claim 11, further comprising:

monitoring the pressure of the fluid supplied to the hydraulic device;

generating a pressure signal when pressure in the fluid is below a minimum pressure; and generating a notification perceivable by an operator in response to the pressure signal.

13. The method according to claim 9, further comprising supplying fluid to a hydraulic device controlling extension of the telescoping boom in a flow direction when the elevation angle exceeds a predetermined threshold angle, and preventing the fluid from flowing in reverse of the flow direction.

14. A compensating device for compensating for fluid contraction in a hydraulic powered telescoping boom of a crane, the crane including an extensible boom and a hydraulic device for extending the boom, the compensating device including:

a monitor determining the elevation angle of the telescoping boom;

a supply of pressurized hydraulic fluid including a reservoir of hydraulic fluid;

an inlet connectable to the supply of pressurized hydraulic fluid;

a fluid control controlling flow of fluid through the inlet and responsive to the monitor determining the elevation angle of the telescoping boom;

an outlet connectable to the hydraulic device and supplying pressurized hydraulic fluid received via the inlet and fluid control to the hydraulic device;

a second connection connectable to the reservoir of hydraulic fluid and establishing a return flow path permitting a portion of the fluid provided to the hydraulic device to return to the reservoir;

a pressure sensor monitoring pressure of the hydraulic fluid between the inlet and the hydraulic device and generating a pressure signal when the pressure is below a minimum pressure; and a warning device generating a signal perceivable by an operator responsive to the signal generated by the pressure sensor.

15. The compensating device according to claim 14, wherein the fluid control comprises a valve responsive to the monitor and controlling flow of fluid from the inlet to the hydraulic device of the crane, and the fluid control enables fluid flow to the hydraulic device when the elevation angle exceeds a predetermined threshold angle.

16. The compensating device according to claim 14, further comprising:

a one way check valve positioned between the inlet and the hydraulic device for preventing flow of fluid from the hydraulic device back to the inlet.

17. The compensating device according to claim 14, further comprising:

a valve operatively connected to the second connection to selectively permit flow of pressurized hydraulic fluid to the second connector and to the reservoir.

18. The compensating device according to claim 17, wherein the valve is a pressure relief valve for limiting the pressure of the pressurized hydraulic fluid provided to the hydraulic device.

* * * * *